(12) United States Patent
Yeon et al.

(10) Patent No.: US 10,988,639 B2
(45) Date of Patent: Apr. 27, 2021

(54) PHOTOCURABLE COMPOSITION FOR OPTICAL BONDING AGENT, IMAGE DISPLAY DEVICE APPLYING SAME, AND METHOD FOR MANUFACTURING IMAGE DISPLAY DEVICE

(71) Applicant: LG Chem, Ltd., Seoul (KR)

(72) Inventors: Bo-Ra Yeon, Gyeonggi-do (KR);
Kyung-Joon Yoon, Gyeonggi-do (KR);
Jang-Soon Kim, Gyeonggi-do (KR);
Jin-Young Huh, Gyeonggi-do (KR);
Min-Kyeong Pyo, Gyeonggi-do (KR)

(73) Assignee: LG Chem, Ltd.

( * ) Notice: Subject to any disclaimer, the term of this patent is extended or adjusted under 35 U.S.C. 154(b) by 135 days.

(21) Appl. No.: 15/565,587

(22) PCT Filed: Mar. 29, 2016

(86) PCT No.: PCT/KR2016/003187
§ 371 (c)(1),
(2) Date: Oct. 10, 2017

(87) PCT Pub. No.: WO2017/047889
PCT Pub. Date: Mar. 23, 2017

(65) Prior Publication Data
US 2018/0112106 A1 Apr. 26, 2018

(30) Foreign Application Priority Data
Sep. 14, 2015 (KR) .......................... 10-2015-0129697

(51) Int. Cl.
*C09J 4/06* (2006.01)
*C08F 265/06* (2006.01)
(Continued)

(52) U.S. Cl.
CPC .............. *C09J 4/06* (2013.01); *C08F 265/06* (2013.01); *C08F 290/067* (2013.01); *C09J 5/00* (2013.01);
(Continued)

(58) Field of Classification Search
CPC ......... C09J 4/06; C09J 5/06; C09J 9/00; C09J 11/08; C09J 133/06; C09J 2433/00;
(Continued)

(56) References Cited

U.S. PATENT DOCUMENTS

2012/0172477 A1 7/2012 Huang et al.
2012/0177912 A1 7/2012 Kim et al.
(Continued)

FOREIGN PATENT DOCUMENTS

JP 2008184538 A 8/2008
JP 2012145751 A 8/2012
(Continued)

OTHER PUBLICATIONS

Search Report from Taiwanese Office Action for TW105110359 dated Jun. 27, 2018.
(Continued)

*Primary Examiner* — Ruiyun Zhang
(74) *Attorney, Agent, or Firm* — Lerner, David, Littenberg, Krumholz & Mentlik, LLP

(57) ABSTRACT

Provided is a photocurable composition for an optical bonding agent, including an acrylic photocurable compound and a plasticizer, in which the acrylic photocurable compound includes a monofunctional acrylic photocurable monomer and a (meth)acrylate-based photocurable polymer having a weight average molecular weight of 50,000 g/mol or less, and the monofunctional acrylic photocurable monomer is
(Continued)

included in an amount of more than 0 wt % and 15 wt % or less in the photocurable composition for the optical bonding agent.

14 Claims, 1 Drawing Sheet

(51) Int. Cl.
*C08F 290/06* (2006.01)
*G02F 1/1333* (2006.01)
*C09J 9/00* (2006.01)
*C09J 5/00* (2006.01)
*C09J 11/08* (2006.01)

(52) U.S. Cl.
CPC ............... *C09J 9/00* (2013.01); *C09J 11/08* (2013.01); *G02F 1/1333* (2013.01); *G02F 1/133308* (2013.01); *C09J 2433/00* (2013.01); *C09K 2323/00* (2020.08); *C09K 2323/05* (2020.08); *C09K 2323/057* (2020.08); *G02F 1/133311* (2021.01); *G02F 2201/50* (2013.01); *G02F 2202/022* (2013.01); *G02F 2202/28* (2013.01)

(58) Field of Classification Search
CPC ............... G02F 1/133; G02F 1/133308; G02F 2001/133311; C08F 265/06; C08F 290/067; Y10T 428/10; Y10T 428/1045; Y10T 428/1077; C09K 2323/00; C09K 2323/05; C09K 2323/057; C09K 2323/035

USPC ............ 428/1.1, 1.5, 1.33, 1.54; 156/275.5; 522/184, 853

See application file for complete search history.

(56) References Cited

U.S. PATENT DOCUMENTS

| 2014/0163130 A1* | 6/2014 | Zhang | C09J 175/14 |
| | | | 522/18 |
| 2014/0329927 A1 | 11/2014 | Ha et al. | |
| 2015/0166860 A1 | 6/2015 | Yuan et al. | |

FOREIGN PATENT DOCUMENTS

| JP | 2013107814 A | 6/2013 |
| JP | 2015114545 A | 6/2015 |
| KR | 20140101344 A | 8/2014 |
| KR | 20150035542 A | 4/2015 |
| KR | 20150046044 A | 4/2015 |
| KR | 101525997 B1 | 6/2015 |
| TW | 201410822 A | 3/2014 |
| WO | 2013084503 A1 | 6/2013 |
| WO | 2013173977 A1 | 11/2013 |

OTHER PUBLICATIONS

Search report from International Application No. PCT/KR2016/003187, dated Jul. 25, 2016.

* cited by examiner

[Figure 1]
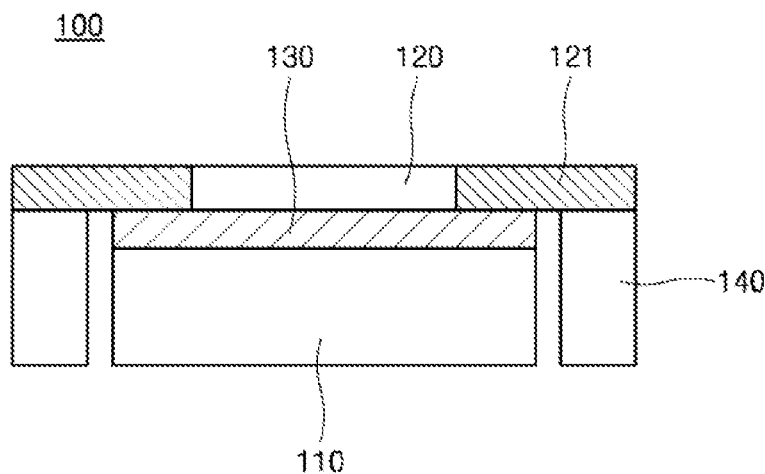
[Figure 2]
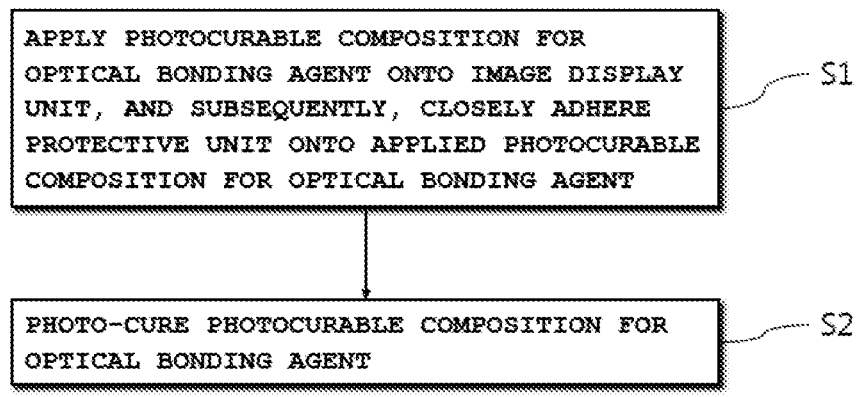

PHOTOCURABLE COMPOSITION FOR OPTICAL BONDING AGENT, IMAGE DISPLAY DEVICE APPLYING SAME, AND METHOD FOR MANUFACTURING IMAGE DISPLAY DEVICE

CROSS-REFERENCE TO RELATED APPLICATION

This application is a national phase entry under 35 U.S.C. § 371 of International Application No. PCT/KR2016/003187, filed Mar. 29, 2016, which claims priority to Korean Patent Application No. 10-2015-0129697, filed Sep. 14, 2015, disclosures of which are incorporated herein by reference.

TECHNICAL FIELD

The present invention relates to a photocurable composition for an optical bonding agent, an image display device to which the photocurable composition for the optical bonding agent is applied, and a method for manufacturing an image display device.

BACKGROUND ART

In an image display device such as a TV set, a computer, and a mobile device, there exists an air layer in which a space between an image display part and a protective part is filled with air, and the air layer may significantly degrade visibility. Thus, for example, the visibility is improved by filling the air layer with a transparent acrylic cured product, and the like, a transparent cured product is typically adhered in the form of an adhesive film or an adhesive sheet on an image display part, and subsequently, the transparent cured product is interposed between the image display part and a protective part by adhering the protective part on the adhesive film or the adhesive sheet.

Since the adhesive film or the adhesive sheet is not easily applied to various structures and it is difficult to remove bubbles during the adhesion, the step absorbency capable of absorbing a printing step by a deco film, and the like deteriorates.

DETAILED DESCRIPTION OF THE INVENTION

Technical Problem

An exemplary embodiment of the present invention provides a photocurable composition for an optical bonding agent, which is capable of implementing excellent durability by suppressing the occurrence of yellowing and yellow edging when applied to a large-area panel which is vulnerable to high temperature and high humidity reliability conditions.

Another exemplary embodiment of the present invention provides an image display device to which the photocurable composition for the optical bonding agent is applied.

Still another exemplary embodiment of the present invention provides a method for manufacturing the image display device.

Technical Solution

An exemplary embodiment of the present invention provides a photocurable composition for an optical bonding agent, including an acrylic photocurable compound and a plasticizer. The acrylic photocurable compound includes a monofunctional acrylic photocurable monomer and a (meth) acrylate-based photocurable polymer having a weight average molecular weight of 50,000 g/mol or less, and the monofunctional acrylic photocurable monomer is included in an amount of more than 0 wt % and 15 wt % or less in the photocurable composition for the optical bonding agent.

Another exemplary embodiment of the present invention provides an image display device including: an image display part; a bonding layer including a photo-cured product of the photocurable composition for the optical bonding agent; and a protective part.

Still another exemplary embodiment of the present invention provides a method for manufacturing an image display device, the method including: applying the liquid photocurable composition for the optical bonding agent onto an image display part, and subsequently, closely adhering a protective part onto the applied photocurable composition for the optical bonding agent; and forming a bonding layer by photo-curing the liquid photocurable composition for the optical bonding agent.

Advantageous Effects

An image display device to which the photocurable composition for the optical bonding agent is applied may exhibit excellent durability by suppressing the occurrence of yellowing and yellow edging when applied to a large-area panel which is vulnerable to high temperature and high humidity reliability conditions.

BRIEF DESCRIPTION OF DRAWINGS

FIG. 1 is a schematic cross-sectional view of an image display device according to an exemplary embodiment of the present invention.

FIG. 2 is a schematic process flow-chart of a method for manufacturing an image display device according to another exemplary embodiment of the present invention.

BEST MODE

Hereinafter, exemplary embodiments of the present invention will be described in detail. However, the exemplary embodiments are suggested as an example, the present invention is not limited thereby, and the present invention is defined only by the scope of the claims to be described below.

An exemplary embodiment of the present invention provides a photocurable composition for an optical bonding agent, including an acrylic photocurable compound and a plasticizer, in which the acrylic photocurable compound includes a monofunctional acrylic photocurable monomer and a (meth)acrylate-based photocurable polymer having a weight average molecular weight of 50,000 g/mol or less, and the monofunctional acrylic photocurable monomer is included in an amount of more than 0 wt % and 15 wt % or less in the photocurable composition for the optical bonding agent.

The photocurable composition for the optical bonding agent may form a bonding layer which adheres an image display part and a protective part formed of an outermost transparent substrate such as tempered glass in a large-area image display device such as an LCD TV.

Typically, in an image display device such as a display, a transparent acrylic cured product is interposed in the form of an adhesive film or an adhesive sheet between an image display part and a protective part, and since it is difficult to completely remove bubbles during the process of attaching the adhesive film or the adhesive sheet, step absorbency deteriorates, and it is not easy to apply the photocurable composition for the optical bonding agent to a large area or a structure having various forms.

Thus, the photocurable composition for the optical bonding agent is formed in a liquid phase, a space between an image display part and a protective part is filled with the liquid photocurable composition for the optical bonding agent, and then the composition is photo-cured to form a bonding layer. As described above, the step absorbency may be enhanced by applying the liquid photocurable composition for the optical bonding agent to prevent bubbles from being generated.

Furthermore, since the photocurable composition for the optical bonding agent has low cure shrinkage, the photocurable composition for the optical bonding agent is relatively soft and thus is suitably applied to an LCD image display device, which is vulnerable to deformation, and particularly vulnerable to high temperature and high humidity reliability conditions.

When the cure shrinkage is high during the curing of a liquid bonding agent composition, stress generated from the image display part and the protective part is increased, and as a result, a warpage may be generated, and accordingly, there is a concern in that yellowing, yellow edging, or mura may be generated on an image display part. Since the photocurable composition for the optical bonding agent has low cure shrinkage, the photocurable composition for the optical bonding agent significantly suppresses the warpage from being generated even when applied to an LCD image display device, and accordingly, yellowing, yellow edging, or mura may not be generated.

Since the photocurable composition for the optical bonding agent has low cure shrinkage, the photocurable composition for the optical bonding agent may be applied variously to the uses which require low cure shrinkage due to the problem of the cure shrinkage, in addition to the LCD image display device.

Hereinafter, each component of the photocurable composition for the optical bonding agent will be described in detail.

The acrylic photocurable compound means a compound which is photocurable by including an acrylate group that is a reaction site which undergoes a photo-curing reaction by light, and the acrylic photocurable compound also includes a monofunctional acrylic compound including one acrylate group in the form of a monomer, and also includes a monofunctional acrylic compound including one acrylate group in the form of a polymer such as an oligomer or a prepolymer. Accordingly, the acrylic photocurable compound includes both a monofunctional acrylic photocurable monomer and a (meth)acrylate-based photocurable polymer.

The monofunctional acrylic photocurable monomer may be specifically a (meth)acrylic acid ester-based monomer, and more specifically, the (meth)acrylic acid ester-based monomer may be alkyl (meth)acrylate, and an alkyl in the alkyl (meth)acrylate may be a linear or branched C1 to C14 alkyl.

The monofunctional acrylic photocurable monomer is a compound having one (meth)acrylate group.

For example, the (meth)acrylic acid ester-based monomer may include one selected from the group including methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isononyl (meth)acrylate, lauryl (meth)acrylate, tetradecyl (meth)acrylate, acrylic acid, methacrylic acid, 2-(meth)acryloyloxy acetic acid, 3-(meth)acryloyloxy propyl acid, 4-(meth)acryloyloxy butyric acid, 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethylene glycol (meth)acrylate, 2-hydroxypropylene glycol (meth)acrylate, and a combination thereof.

In an exemplary embodiment, the monofunctional acrylic photocurable monomer may have a glass transition temperature (Tg) of about −60° C. to about 100° C. When the photocurable composition for the optical bonding agent is cured by using a monofunctional acrylic photocurable monomer having a glass transition temperature (Tg) within the range, a low cure shrinkage at a predetermined level may be implemented.

The (meth)acrylate-based photocurable polymer may be specifically in the form of an oligomer having a weight average molecular weight of about 1,000 g/mol or less, or in the form of a prepolymer having a weight average molecular weight of more than about 1,000 g/mol.

The (meth)acrylate-based photocurable polymer has an acrylate group as a reaction site, which undergoes a photo-curing reaction by light, at the ends thereof, as described above. For example, the (meth)acrylate-based photocurable polymer may have a monofunctional to hexafunctional acrylate group. Since the acrylate group serves as a site capable of forming a bond by a photo-curing and thus causes shrinkage, the low content of the acrylate group is advantageous in view of only lowering a cure shrinkage as described above, and as a result, the (meth)acrylate-based photocurable polymer may have a monofunctional or difunctional acrylate group.

The (meth)acrylate-based photocurable polymer may include at least one selected from the group consisting of, for example, a urethane (meth)acrylate photocurable polymer, a polyester (meth)acrylate photocurable polymer, an epoxy (meth)acrylate photocurable polymer, a polyether (meth)acrylate photocurable polymer, a polybutadiene (meth)acrylate photocurable polymer, and a combination thereof, but the (meth)acrylate-based photocurable polymer is not limited thereto.

For example, the urethane (meth)acrylate photocurable polymer may be UV-cured by imparting an acrylate group to a urethane resin, and collectively refers to a compound having a urethane bond and an acrylate group. A urethane bond may be formed by subjecting an isocyanate-based compound and a polyol to a polymerization reaction, and for example, the urethane (meth)acrylate photocurable polymer is formed by introducing an acrylate group into the ends of a urethane compound including a urethane bond formed by reacting the isocyanate-based compound with a (meth)acrylic acid hydroxy alkyl ester-based compound, and the urethane (meth)acrylate photocurable polymer may be an oligomer or a prepolymer polymerized and formed to have a weight average molecular weight of about 500 to about 50,000. According to the physical properties required, an acrylate group to be introduced may be adjusted, and it is possible to prepare difunctional, trifunctional, and hexafunctional urethane (meth)acrylate photocurable polymers into which two, three, and six acrylate groups are introduced, respectively.

Specific examples of the isocyanate-based compound include an aliphatic isocyanate-based compound such as hexamethylene diisocyanate (HMDI) and isophorone diisocyanate (IPDI), an aromatic isocyanate-based compound such as toluene diisocyanate (TDI) and methylene diphenyl diisocyanate (MDI), and the like, and these compounds may be used either alone or in mixture of two or more thereof.

Specific examples of the (meth)acrylic acid hydroxy alkyl ester-based compound include 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethylene glycol (meth)acrylate, 2-hydroxypropylene glycol (meth)acrylate, and the like, and a combination thereof may be used.

In the photocurable composition for the optical bonding agent, the shrinkage is adjusted by including the monofunctional acrylic photocurable monomer as an acrylic photocurable compound, the bonding strength and hardness may be adjusted according to Tg, and the viscosity may be lowered. Since the monofunctional acrylic photocurable monomer has a relatively small molecular weight, the shrinkage is increased as the content thereof is increased, so that the shrinkage may be lowered by appropriately lowering the content.

Further, the permittivity may be adjusted by including the (meth)acrylate-based photocurable polymer, and the bonding strength, hardness, and elastic modulus may be adjusted according to the number of functional groups and the molecular weight. Specifically, the (meth)acrylate-based photocurable polymer determines the permittivity of the bonding agent according to the chemical characteristics of the polyol in the polymerization structure and has a higher molecular weight than that of the monofunctional acrylic photocurable monomer, and thus does not greatly affect the shrinkage.

The photocurable composition for the optical bonding agent includes the monofunctional acrylic photocurable monomer in a relatively low amount of more than 0 wt % and 15 wt % or less, specifically, about 2 wt % to about 8 wt % in the photocurable composition for the optical bonding agent.

When the content of a monomer in a composition for an optically transparent bonding agent becomes high, the bonding strength is enhanced, but the cure shrinkage is increased, and as a result, the acrylic photocurable compound is composed so as to include the monofunctional acrylic photocurable monomer and the (meth)acrylate-based photocurable polymer at a content ratio within the range, thereby implementing excellent bonding strength while implementing a low cure shrinkage at a predetermined level, for example, at a level suitably applied to a large-area LCD image display device, during the curing of the photocurable composition for the optical bonding agent.

By using the monofunctional acrylic photocurable monomer at a content within the range, the photocurable composition for the optical bonding agent may not include a separate polyfunctional cross-linking agent so as to implement excellent bonding strength while implementing a low cure shrinkage and to satisfy the purpose. The reason is that the polyfunctional cross-linking agent hinders an action of the monofunctional acrylic photocurable monomer in a content within the range.

The photocurable composition for the optical bonding agent includes a (meth)acrylate-based photocurable polymer in an amount at a relatively high level to have a small number of functional groups or photo-curing reaction sites capable of forming a bond by photo-curing, thereby further reducing a cure shrinkage. A bonding agent formed by photo-curing the photocurable composition for an optical bonding agent may further reduce stress, which is generated from an image display part and a protective part, while having appropriate flexibility.

The plasticizer uses a compound which has compatibility with the acrylic photocurable compound and does not include a photo-reactive functional group such as an acryl group at the ends thereof. It is possible to use a publicly-known compound satisfying these conditions, and specifically, the plasticizer may include one selected from the group consisting of an epoxy-based plasticizer, a fatty acid ester-based plasticizer, a polyester-based plasticizer, a polybutadiene-based plasticizer, and a combination thereof.

Since the photocurable composition for the optical bonding agent includes a monofunctional acrylic photocurable monomer in a relatively low amount in the acrylic photocurable compound, the photocurable composition for the optical bonding agent may include the plasticizer in a relatively high content. However, when the content of the plasticizer is extremely increased, there occurs a migration phenomenon in which the plasticizer migrates to a surface of a product after being applied to the product, so that a residual bonding agent, dirt, and the like are generated on the surface, and as a result, there is a concern in that the surface appearance and bonding performance may deteriorate, and the content of the plasticizer may be determined at a level capable of implementing an appropriate viscosity because an appropriate viscosity needs to be implemented when the plasticizer is applied to a large-area image display device.

In an exemplary embodiment, a weight ratio of the monofunctional acrylic photocurable monomer to the plasticizer may be about 1:3 to about 1:20. The photocurable composition for the optical bonding agent includes the monofunctional acrylic photocurable monomer and the plasticizer at the content ratio, thereby implementing excellent bonding strength while implementing a low cure shrinkage at a level suitably applied to, for example, an LCD image display device, and being appropriately applied to a large-area image display device.

The photocurable composition for the optical bonding agent may further include a photoinitiator.

Examples of the photoinitiator include: an α-hydroxyketone-based compound (for example, IRGACURE 184, IRGACURE 500, IRGACURE 2959, DAROCUR 1173; manufactured by Ciba Specialty Chemicals Co., Ltd.); a phenylglyoxylate-based compound (for example, IRGACURE 754, DAROCUR MBF; manufactured by Ciba Specialty Chemicals Inc.); a benzyldimethylketal-based compound (for example, IRGACURE 651; manufactured by Ciba Specialty Chemicals Inc.); an α-aminoketone-based compound (for example, IRGACURE 369, IRGACURE 907, IRGACURE 1300; manufactured by Ciba Specialty Chemicals Inc.); a monoacylphosphine-based compound (MAPO) (for example, DAROCUR TPO; manufactured by Ciba Specialty Chemicals Inc.); a bisacylphosphene-based compound (BAPO) (for example, IRGACURE 819, IRGACURE 819DW; manufactured by Ciba Specialty Chemicals Inc.); a phosphine oxide-based compound (for example, IRGACURE 2100; manufactured by Ciba Specialty Chemicals Inc.); a metallocene-based compound (for example, IRGACURE 784; Ciba Specialty Chemicals Inc.); an iodonium salt (for example, IRGACURE 250; Ciba Specialty Chemicals Inc.); and a mixture of one or more thereof (for example, DAROCUR 4265, IRGACURE 2022, IRGA- CURE 1300, IRGACURE 2005, IRGACURE 2010, IRGACURE 2020; Ciba Specialty Chemicals Inc.), and the like, and are not limited thereto.

Further, the photocurable composition for the optical bonding agent may further include at least one selected from the group consisting of a surface lubricant, a leveling agent, a softener, an antioxidant, an anti-aging agent, a light stabilizer, an ultraviolet absorber, a polymerization inhibitor, and a combination thereof.

As the UV absorber, it is possible to use, for example, a benzotriazole-based UV absorber, a benzophenone-based UV absorber, a salicylic acid-based UV absorber, or a cyanoacrylate-based UV absorber, and the like, and as the antioxidant, it is possible to use, for example, a hindered phenol-based antioxidant, a sulfur-based antioxidant, or a phosphorus-based antioxidant, and the like, and as the light stabilizer, it is possible to use, for example, a hindered amine-based light stabilizer and the like, but the examples thereof are not limited thereto, and the type publicly known in the art may be appropriately used according to the object and use of the invention.

In order for the photocurable composition for the optical bonding agent to be used as a bonding agent which adheres a large-area image display part and a protective part in a large-area image display device, the viscosity thereof needs to be adjusted.

Specifically, the photocurable composition for the optical bonding agent may have a viscosity of specifically about 2,000 cps to about 40,000 cps, and more specifically, about 3,000 cps to about 20,000 cps, at about 25° C. By having a viscosity within the range, even though the photocurable composition for the optical bonding agent is applied to a large-area display device, the image display part and the protective part may be adhered to each other at an excellent level while the photocurable composition is not overflowed when the image display part and the protective part are closely adhered to each other.

In an exemplary embodiment, the photocurable composition for the optical bonding agent may be used as a liquid solvent-free type to effectively reduce the cure shrinkage when applied as a liquid bonding agent to adhere an image display part and a protective part to each other in an LCD image display device, thereby preventing yellowing, yellow edging, or mura from being generated.

FIG. 1 is a schematic cross-sectional view of an image display device 100 according to another exemplary embodiment of the present invention.

Another exemplary embodiment of the present invention provides the image display device 100 including: an image display part 110; a bonding layer 130 formed by photo-curing the photocurable composition for the optical bonding agent; and a protective part 120.

The detailed description on the photocurable composition for the optical bonding agent is the same as that described above.

The image display part 110 may be a liquid crystal display (LCD), and for example, an uppermost layer of the image display part 110 may be a polarizing film, but is not limited thereto. Furthermore, the protective part 120 may be a glass substrate or a transparent plastic substrate, but is not limited thereto. A light shielding unit 121 may be formed at the edge of the protective part 120.

The bonding layer 130 is interposed between the image display part 110 and the protective part 120, and may be formed by photo-curing a liquid photocurable composition for the optical bonding agent.

For example, the photocurable composition for the optical bonding agent may be applied onto a polarizing film being the uppermost part layer of the image display part 110, an empty space between the image display part 110 and the protective part 120 may be filled with the photocurable composition for the optical bonding agent by covering and closely adhering a glass substrate or transparent plastic substrate on the applied photocurable composition for the optical bonding agent, and then the photocurable composition for the optical bonding agent may be photo-cured in a liquid state to form the bonding layer 130.

As a method for applying the photocurable composition for the optical bonding agent, it is possible to use one of, for example, a die coating method, a gravure coating method, a knife coating method, and a bar coating method, but the method is not limited thereto.

The liquid photocurable composition for the optical bonding agent may be photo-cured under a light quantity condition of about 2,000 mJ/cm$^2$ to about 6,000 mJ/cm$^2$. By photo-curing the liquid photocurable composition for the optical bonding agent at a light quantity within the range, the cure shrinkage may be implemented at a low level while the image display part 110 and the protective part 120 may be adhered to each other at an excellent level.

For the photo-curing, for example, a metal halide lamp, and the like may be used, but a photo-curing device is not limited thereto.

The cure shrinkage of the photocurable composition for the optical bonding agent may be, for example, about 3.0% or less, and for example, about 1% to about 2.5%. The photocurable composition for the optical bonding agent has a low cure shrinkage within the range to further decrease stress generated from the image display part 110 and the protective part 120, and simultaneously, to decrease the content of the plasticizer as described above, and as a result, an excellent surface appearance and a uniform bonding performance over a long period of time may be implemented.

In general, as the cure shrinkage is increased, stress generated from the image display part 110 and the protective part 120 may be increased, and when the stress is increased as described above, a warpage phenomenon occurs, and as a result, yellowing, yellow edging, or mura may be generated.

Further, the bonding layer 130 may have a thickness of about 50 µm to about 300 µm. By having a thickness within the range, an excellent bonding strength may be implemented, and simultaneously, a gap between the image display part 110 and the protective part 120 may be sufficiently filled up.

Further, the image display device 100 may further include a fixing jig 140 which fixes the protective part 120, and the like. As the fixing jig 140, the type publicly known in the art may be used, and the fixing jig 140 is not particularly limited.

FIG. 2 schematically illustrates a process flow-chart of a method for manufacturing an image display device according to still another exemplary embodiment of the present invention.

Still another exemplary embodiment of the present invention provides a method for manufacturing an image display device, the method including: applying the liquid photocurable composition for the optical bonding agent onto an image display part, and subsequently, closely adhering a protective part onto the applied photocurable composition for the optical bonding agent; and forming a bonding layer by photo-curing the liquid photocurable composition for the optical bonding agent.

The method for manufacturing the image display device includes: applying the liquid photocurable composition for the optical bonding agent onto an image display part, and subsequently, covering and closely adhering a protective part onto the applied photocurable composition for the optical bonding agent (S1); and photo-curing the liquid photocurable composition for the optical bonding agent (S2).

The image display part, the protective part, and the photocurable composition for the optical bonding agent are the same as those described above in an exemplary embodiment and another exemplary embodiment of the present invention.

Hereinafter, Examples and Comparative Examples of the present invention will be described. However, the following Examples are only an Example of the present invention, and the present invention is not limited to the following Examples.

EXAMPLES

Example 1

A total 100 parts by weight of 25 wt % of a monofunctional urethane acrylate-based oligomer having a weight average molecular weight of 15,000 g/mol, 15 wt % of a difunctional urethane acrylate-based oligomer having a weight average molecular weight of 15,000 g/mol, 5 wt % of a lauryl acrylate monomer (glass transition temperature −30° C.), 35 wt % of a polybutadiene plasticizer, and 20 wt % of a terpene-based tackifier; 1.5 parts by weight of photoinitiator; and 1 part by weight of an antioxidant were mixed and stirred to prepare a photocurable composition for an optical bonding agent, which has a viscosity of 5,000 cps at 25° C.

Example 2

A composition for an optically transparent bonding agent was prepared in the same manner as in Example 1, except that in Example 1, the lauryl acrylate monomer was adjusted to 10 wt % and the polybutadiene plasticizer was adjusted to 30 wt %.

Example 3

A composition for an optically transparent bonding agent was prepared in the same manner as in Example 1, except that in Example 1, the lauryl acrylate monomer was adjusted to 15 wt % and the polybutadiene plasticizer was adjusted to 25 wt %.

Comparative Example 1

A composition for an optically transparent bonding agent was prepared in the same manner as in Example 1, except that in Example 1, the mixture was adjusted to total 100 parts by weight of 25 wt % of a monofunctional urethane acrylate-based oligomer having a weight average molecular weight of 15,000 g/mol, 20 wt % of a lauryl acrylate monomer (glass transition temperature −30° C.), 35 wt % of a polybutadiene plasticizer, and 20 wt % of a terpene-based tackifier.

Comparative Example 2

A composition for an optically transparent bonding agent was prepared in the same manner as in Example 1, except that in Example 1, the mixture was adjusted to total 100 parts by weight of 25 wt % of a monofunctional urethane acrylate-based oligomer having a weight average molecular weight of 15,000 g/mol, 30 wt % of a lauryl acrylate monomer (glass transition temperature −30° C.), 25 wt % of a polybutadiene plasticizer, and 20 wt % of a terpene-based tackifier.

EXPERIMENTAL EXAMPLES

Each of the compositions for an optically transparent bonding agent according to Examples 1 to 3 and Comparative Examples 1 and 2 was applied onto a polarizing film being an uppermost layer of an LCD, and then a glass substrate covered the top of the applied composition for an optically transparent bonding agent, and subsequently, the composition was photo-cured at 3,000 mJ/cm$^2$ by using a metal halide lamp (Dymax, 5000 EC) to form a bonding layer, thereby manufacturing an image display device in which the polarizing film and the glass substrate were adhered to each other through the bonding layer.

Each bonding layer had a thickness of 200 μm, the physical properties of each bonding layer were evaluated, and the results are described in the following Table 1.

Experimental Example 1: Evaluation of Cure Shrinkage

For each of the image display devices manufactured as described above by using the compositions for the optically transparent bonding agent prepared in Examples 1 to 3 and Comparative Examples 1 and 2, the cure shrinkage was evaluated by the following method.

Measurement Method: the specific weight of the composition for the optically transparent bonding agent and the specific weight of the photo-cured product thereof were measured at 25° C., and the cure shrinkage was calculated by substituting the specific weights for the following Equation 1.

$$\text{Cure shrinkage (\%)} = (B-A)/B \times 100 \quad \text{[Equation 1]}$$

In Equation 1, A is a specific weight of the composition before the photo-curing, and B is a specific weight of a cured product formed by photo-curing the composition for the optically transparent bonding agent.

The evaluation results are shown in the following Table 1.

Experimental Example 2: Evaluation of E-Type Hardness

For each of the image display devices manufactured as described above by using the compositions for the optically transparent bonding agent prepared in Examples 1 to 3 and Comparative Examples 1 and 2, the E-type hardness was evaluated by the following method.

A Teflon frame having a diameter of 2 cm and a thickness of 6 mm was placed between release films, and a liquid adhesive agent was applied thereon. The front and rear of the Teflon frame was irradiated with light at a light quantity of 3.00 mJ/cm$^2$ by using a metal halide lamp (Dymax, 5000 EC). The solid adhesive agent was separated from the Teflon frame, and then cooled so as to reach room temperature, and then the hardness was measured by an ASKER E-type hardness tester.

The evaluation results are shown in the following Table 1.

Experimental Example 3: Evaluation of Reliability

For each of the image display devices manufactured as described above by using the compositions for the optically transparent bonding agent prepared in Examples 1 to 3 and Comparative Examples 1 and 2, the reliability was evaluated by the following method.

Measurement method: from the time point when each image display device was manufactured, the image display device was left to stand at a high temperature of 60° C. and a high humidity of a 90% relative humidity for at least 240 hours, and subsequently, each image display device was driven, and then it was observed whether there was a portion where a yellow discoloration occurred by observing the edge portion of the glass substrate by the unaided eye, and a case where there occurred the yellowing phenomenon in which the color was discolored into yellow was marked with "○" and a case where the yellowing phenomenon did not occur was marked with "X".

The evaluation results are shown in the following Table 1.

TABLE 1

| | Cure shrinkage (%) | E-type hardness | Evaluation of reliability (occurrence of yellow edging) |
|---|---|---|---|
| Example 1 | 0.7 | 5 | X |
| Example 2 | 0.9 | 7 | X |
| Example 3 | 1.2 | 8 | X |
| Comparative Example 1 | 2.1 | 12 | O |
| Comparative Example 2 | 3.2 | 15 | O |

In Table 1, it was confirmed that in Examples 1 to 3, the cure shrinkages were low, soft characteristics were exhibited in consideration of the E-type hardness value, and accordingly, yellow edging was not generated even in the evaluation of reliability, so that excellent results could be obtained.

Since the result of Example 1 was the best, it could be confirmed that a small content of the monomer in the photocurable composition for the optical bonding agent prevented the yellowing phenomenon.

Although the preferred exemplary embodiments of the present invention have been described in detail hereinabove, the right scope of the present invention is not limited thereto, and various variations and modifications of a person skilled in the art using the basic concept of the present invention, which is defined in the following claims, also fall within the right scope of the present invention.

The invention claimed is:

1. A photocurable composition for an optical bonding agent, comprising:
    an acrylic photocurable compound; and
    a plasticizer,
    wherein the acrylic photocurable compound comprises a monofunctional acrylic photocurable monomer and a (meth)acrylate-based photocurable polymer having a weight average molecular weight of 50,000 g/mol or less, and
    the monofunctional acrylic photocurable monomer is comprised in an amount of 5 wt % to 15 wt %-in the photocurable composition for the optical bonding agent,
    wherein the (meth)acrylate-based photocurable polymer is one selected from the group consisting of urethane (meth)acrylate, polyester (meth)acrylate, epoxy (meth)acrylate, polyether (meth)acrylate, polybutadiene (meth)acrylate, and a combination thereof, and
    wherein the (meth)acrylate-based photocurable polymer comprises both a monofunctional (meth)acrylate-based photocurable polymer and a difunctional (meth)acrylate-based photocurable polymer,
    wherein the monofunctional acrylic photocurable monomer is lauryl (meth)acrylate, and
    wherein the curing shrinkage is less than or equal to 1.2%.

2. The photocurable composition of claim 1, wherein the monofunctional acrylic photocurable monomer has a glass transition temperature (Tg) of −60° C. to 100° C.

3. The photocurable composition of claim 1, wherein the plasticizer comprises one selected from the group consisting of an epoxy-based plasticizer, a fatty acid ester-based plasticizer, a polyester-based plasticizer, a polybutadiene-based plasticizer, and a combination thereof.

4. The photocurable composition of claim 1, wherein a weight ratio of the monofunctional acrylic photocurable monomer to the plasticizer is 1:3 to 1:20.

5. The photocurable composition of claim 1, further comprising:
    a photoinitiator.

6. The photocurable composition of claim 5, wherein the photoinitiator is one selected from the group consisting of a hydroxyketone-based compound, a phenylglyoxylate-based compound, a benzyldimethylketal-based compound, an α-aminoketone-based compound, a monoacylphosphine-based compound, a bisacylphosphene-based compound, a phosphine oxide-based compound, a metallocene-based compound, an iodonium salt, and a combination thereof.

7. The photocurable composition of claim 1, further comprising:
    one additive selected from the group consisting of a lubricant, a leveling agent, a softener, an antioxidant, an anti-aging agent, a light stabilizer, an ultraviolet absorber, a polymerization inhibitor, and a combination thereof.

8. The photocurable composition of claim 1, wherein photocurable composition for the optical bonding agent has a viscosity of 2,000 cps to 40,000 cps at 25° C.

9. The photocurable composition of claim 1, wherein photocurable composition for the optical bonding agent is a liquid solvent-free type.

10. An image display device comprising:
    an image display part;
    a bonding layer comprising a photo-cured product of the photocurable composition for the optical bonding agent according to claim 1; and
    a protective part.

11. The image display device of claim 10, wherein the bonding layer has a thickness of 50 μm to 300 μm.

12. The image display device of claim 10, wherein the image display part is a liquid crystal display (LCD).

13. The image display device of claim 10, wherein the protective part is a glass substrate or a transparent plastic substrate.

14. A method for manufacturing an image display device, the method comprising:

applying the liquid photocurable composition for the optical bonding agent according to claim 8 onto an image display part, and subsequently, closely adhering a protective part onto the applied photocurable composition for the optical bonding agent; and forming a bonding layer by photo-curing the liquid photocurable composition for the optical bonding agent.

\* \* \* \* \*